Patented June 19, 1923.

1,458,969

UNITED STATES PATENT OFFICE.

FELICE BENSA, OF GENOA, ITALY.

PROCESS OF OXIDIZING AMMONIA AND RECOVERING ACID AS ALKALI-METAL SALTS.

No Drawing.   Application filed August 30, 1920. Serial No. 407,036.

(GRANTED UNDER THE PROVISIONS OF THE ACT OF MARCH 3, 1921, 41 STAT. L., 1313.)

*To all whom it may concern:*

Be it known that I, FELICE BENSA, manufacturer, subject of the Kingdom of Italy, and resident of Genoa, Italy, have invented or discovered a certain new and useful Process of Oxidizing Ammonia and Recovering Acid as Alkali-Metal Salts (for which I have filed application in Italy August 4, 1915; France July 29, 1916; England August 4, 1916), of which the following is a specification.

The process forming the subject of the present invention has for its object the economic production of alkaline nitrates and especially of sodium nitrate, starting with ammonia obtained either by acting on cyanamides, cyanides and nitrides with steam, or derived from the distillation of oil, and lignites, peat or waste matter, or from the direct combination of atmospheric nitrogen with hydrogen.

In the conversion of ammonia into nitric acid various catalysts such as oxides of copper of iron and of the rare metals have been used in association with platinized or palladiumized asbestos. Catalytic oxidation of ammonia has also been effected in the presence of steam. It has also been proposed to effect the absorption of the nitrogen oxides produced by the catalytic oxidation of ammonia in solid bases such as alkalis or alkaline earth hydrates or carbonates at a high temperature.

The process according to my invention consists in bringing a mixture of steam, hot ammoniacal gases and a considerable quanity of air into a retort maintained at a temperature of 600 to 800° C., said retort containing a layer of platinized or palladiumized asbestos and separate layers of oxide of copper, oxide of iron and oxides of rare earths, said layers being suitably arranged to cause the passage of said mixture of gases through them successively, and passing said gases from said retort to receptacles containing alkaline carbonates, said receptacles being maintained at a temperature of 300 to 350° C.

The process is practised commercially as follows:—

First, there are introduced into a retort brought to a temperature of from 600 to 800° C., hot ammoniacal gases mixed with steam together with a considerable quantity of air or oxygen. The said gases first meet in the retort a layer of platinized or palladiumized asbestos and subsequently contact with layers of iron and of oxides of rare earths, the copper oxide, etc., being arranged preferably in separate layers.

The oxidation of the nitrogen takes place, and the NO and $NO_2$ combine with the steam to produce nitric acid and nitrous acid.

The gases leaving the retort are led directly into receptacles of refractory material containing solid alkaline carbonates.

The said receptacles are disposed in series in such manner that the gaseous mixture passes through the contents of the second receptacle after having acted on the contents of the first.

The receptacles are maintained at a temperature between 300 and 350° C. When the mass is in a state of fusion, the operation is concluded and the product drawn off.

Having now particularly described and ascertained the nature of my said invention and in what manner the same is to be performed, I declare that what I claim is:—

The herein described process of oxidizing ammonia and recovering acid as alkali-metal salts, said process consisting in subjecting a layer of metalized asbestos and separate layers of oxide of copper, oxide of iron, and oxides of rare earths to the action of a mixture of steam, hot ammoniacal gases and air in a retort maintained at a temperature of from 600° to 800° C., passing said mixture of gases through said layers, and then passing said gases to receptacle containing alkaline carbonates, said receptacles being maintained at a temperature of from 300° to 350° C.

Signed at Milan, Italy, this 1st day of July, A. D. 1920.

FELICE BENSA.